US012592351B2

(12) United States Patent
Poeltl et al.

(10) Patent No.: US 12,592,351 B2
(45) Date of Patent: Mar. 31, 2026

(54) PYROTECHNIC CIRCUIT BREAKER

(71) Applicants: Peter Poeltl, Hirtenberg (AT); Ludwig Marker, Grillenberg (AT); Peter Kreuz, Moosbrunn (AT); Kurt Aigner, Vienna (AT); Sami Rassy, Baden (AT)

(72) Inventors: Peter Poeltl, Hirtenberg (AT); Ludwig Marker, Grillenberg (AT); Peter Kreuz, Moosbrunn (AT); Kurt Aigner, Vienna (AT); Sami Rassy, Baden (AT)

(73) Assignee: ASTOTEC AUTOMOTIVE GMBH, Hirtenberg (AT)

( * ) Notice: Subject to any disclaimer, the term of this patent is extended or adjusted under 35 U.S.C. 154(b) by 643 days.

(21) Appl. No.: 17/771,030

(22) PCT Filed: Jul. 15, 2021

(86) PCT No.: PCT/AT2021/060251
§ 371 (c)(1),
(2) Date: Aug. 29, 2022

(87) PCT Pub. No.: WO2022/011410
PCT Pub. Date: Jan. 20, 2022

(65) Prior Publication Data

US 2025/0385060 A1 Dec. 18, 2025

(30) Foreign Application Priority Data

Jul. 15, 2020 (AT) .............................. A 50613/2020
Jun. 2, 2021 (AT) .............................. A 50453/2021

(51) Int. Cl.
*H01H 39/00* (2006.01)
*H01H 9/32* (2006.01)

(52) U.S. Cl.
CPC ............ *H01H 39/006* (2013.01); *H01H 9/32* (2013.01)

(58) Field of Classification Search
CPC .......... H01H 39/006; H01H 9/32; H01H 9/30; H01H 2039/008; H01H 39/00
(Continued)

(56) References Cited

U.S. PATENT DOCUMENTS 7,222,561 B2 5/2007 Brede
10,068,732 B2 9/2018 Gaudinat
(Continued)

FOREIGN PATENT DOCUMENTS

WO 2020093079 A 5/2020

*Primary Examiner* — Lheiren Mae A Caroc
(74) *Attorney, Agent, or Firm* — Andrew Wilford

(57) ABSTRACT

A pyrotechnic current breaker (1) for severing a conductor (3) by means of a severing piston (2) has a housing, which comprises a housing upper part (8) and a housing lower part (10). The conductor (3) extends through the housing between the housing upper part (8) and the housing lower part (10), and the severing piston (2) is guided in a cavity (7, 9) in the housing. The current breaker (1) also has an ignition unit (13) for driving the severing piston (2). A quenching means (18) is provided for suppressing or quenching the arc produced during the severing. According to the invention, the quenching means (18) is situated in a recess (17) on the periphery of the severing piston (2). A seal between the severing piston and the housing, more particularly an o-ring (20-21) positioned in an additional recess (19, 22) in the severing piston (2), is preferably provided adjacent to the recess (17).

15 Claims, 1 Drawing Sheet

(58) Field of Classification Search
USPC ........................................................ 200/61.08
See application file for complete search history.

(56) References Cited

U.S. PATENT DOCUMENTS

| | | | | |
|---|---|---|---|---|
| 10,418,212 | B2 | 9/2019 | Warenits | |
| 2022/0037094 | A1 | 2/2022 | Burkett | |
| 2024/0071701 | A1 * | 2/2024 | Fujiwara | H01H 50/02 |
| 2025/0210290 | A1 * | 6/2025 | Fujiwara | H01H 9/30 |

* cited by examiner

PYROTECHNIC CIRCUIT BREAKER

CROSS REFERENCE TO RELATED APPLICATIONS

This application is the US-national stage of PCT application PCT/AT2021/060251 filed 15 Jul. 2021 and claiming the priority of Austrian patent application A50613/2020 itself filed 15 Jul. 2020 and Austrian patent application A50453/2021 itself filed 2 Jun. 2021.

TECHNICAL FIELD

The present invention relates to a pyrotechnic current breaker for cutting a conductor with a disconnect punch, where the current breaker has a housing with an upper housing part and a lower housing part, a conductor passes through the housing between the upper housing part and the lower housing part, the disconnect punch is movable along a chamber of the housing, the current breaker has an igniter for driving the disconnect punch, and furthermore an extinguishing agent is provided for suppressing or extinguishing the arc produced during separation.

PRIOR ART

Pyrotechnic current breakers are used in a variety of applications if it is necessary to irreversibly interrupt electrical connections. In the automotive sector, first of all, as described, for example in DE 10337958 [U.S. Pat. No. 7,222,561] of Dynamit Nobel where the emergency disconnection of the low-voltage battery is effected. The demands made by the use of fully electric and hybrid drives were carried out with new concepts, such as for example in EP 3301701 [U.S. Pat. No. 10,068,732] of Autoliv. To further improve the extinguishing process, extinguishing agents have been introduced, for example in AT 517872 [U.S. Pat. No. 10,418,212] of Miltenberger that forms the preamble of claim 1. The provision of the extinguishing agent between a pressure punch and a disconnect punch described there, however, requires a very pressure-resistant housing because the pressure in the pasty or even liquid extinguishing agent is distributed in all directions, that is to say also acts outward.

OBJECT OF THE INVENTION

The object of the present invention is to eliminate this disadvantage.

SUMMARY OF THE INVENTION

This object is achieved according to the invention by a current breaker of the type described above where the extinguishing agent is provided in a groove on the outer surface of the disconnect punch.

As a result of this arrangement, the extinguishing agent is no longer used to transfer the pressure from the pressure punch to the disconnect punch, that is to say is not pressurized during the circuit interruption process, so that the housing is thus not additionally stressed radially outward. Nevertheless, the extinguishing agent reliably reaches the region of an all-round arc because it is positively moved in the chamber of the disconnect punch.

In particular, if the extinguishing agent is of low viscosity, it is advantageous if the seal is further removed from the igniter than the extinguishing agent. This seal or O-ring prevents the extinguishing agent from flowing out of the chamber over time and dripping down.

If only one such seal is provided, it is expedient if the seal is further removed from the igniter than the extinguishing agent, because such current breakers are normally installed with the igniter up, so that this one O-ring is sufficient to prevent leaking of the extinguishing agent.

In order to be independent of the installation position, however, it is preferred that a seal is provided on both sides of the extinguishing agent. In this case for example three grooves are present and the extinguishing agent is in the central groove and an O-ring is provided in each of the two other grooves. In this way, the extinguishing agent cannot escape in any direction.

It is further advantageous in the solution according to the invention that a very small amount of the extinguishing agent is used. It is preferred that the amount of extinguishing agent is between 0.3 and 5 g.

In a concrete implementation, it is provided that the length of the chamber is 1-20 mm and the depth of the groove is at most 40%, preferably at most 30%, particularly preferably at most 20% of the diameter of the disconnect punch. The “length” is to be understood to mean the extension in the axial direction of the disconnect punch.

The extinguishing agent can be silicon or a silicon-containing substance, and the silicon can be liquid, pasty or also solid. In the latter case, it can preferably be in the form of a tube.

Finally, it is preferred if the extinguishing agent only comes into the region of the conductor end parts after 50% of the punch travel, particularly preferably only after 66% of the punch travel. In this way, the arc is confined before it is eliminated by the extinguishing agent, which facilitates the deletion.

In particular, if the extinguishing agent is liquid or pasty, it is not simple to make the current breaker. The preferred production method consists in first producing the upper housing part, the lower housing part and the disconnect punch with the groove for the extinguishing agent, then the disconnect punch is inserted into an external fill tube whose cross-section corresponds to the cross-section of the chamber in the housing and the chamber is filled, then the tube is placed on the upper housing part and the disconnect punch is pushed down into the chamber, after which the igniter is placed on the chamber, and the upper housing part and lower housing part are connected to one another while the conductor is inserted. The filling in the external fill tube can be carried out very simply by virtue of the fact that the fill tube has at least an inlet hole for supplying the extinguishing agent and an outlet hole for draining off, that the disconnect punch is positioned in the fill tube in such a way that the two holes lie at the same axial height as the chamber in the punch, and in that extinguishing medium is fed through the inlet hole until extinguishing agent emerges from the outlet hole.

The cross-section of the outlet hole for draining the extinguishing agent out of the fill tube is smaller than the cross-section of the inlet hole and/or the two holes are axially offset with respect to the central axis of the disconnect punch. In the latter case, the fill tube is of course to be used in such a way that the outlet hole is higher than the inlet hole.

Especially in this production method with a fill tube, the above-mentioned seals, for example O-rings, are helpful because they act in a sealing manner both during the transfer of the disconnect punch from the fill tube into the housing and in the housing of the current breaker.

BRIEF DESCRIPTION OF THE DRAWINGS

The present invention is explained in more detail with reference to the accompanying drawings, in which.

SPECIFIC DESCRIPTION OF THE INVENTION

Figure 1:
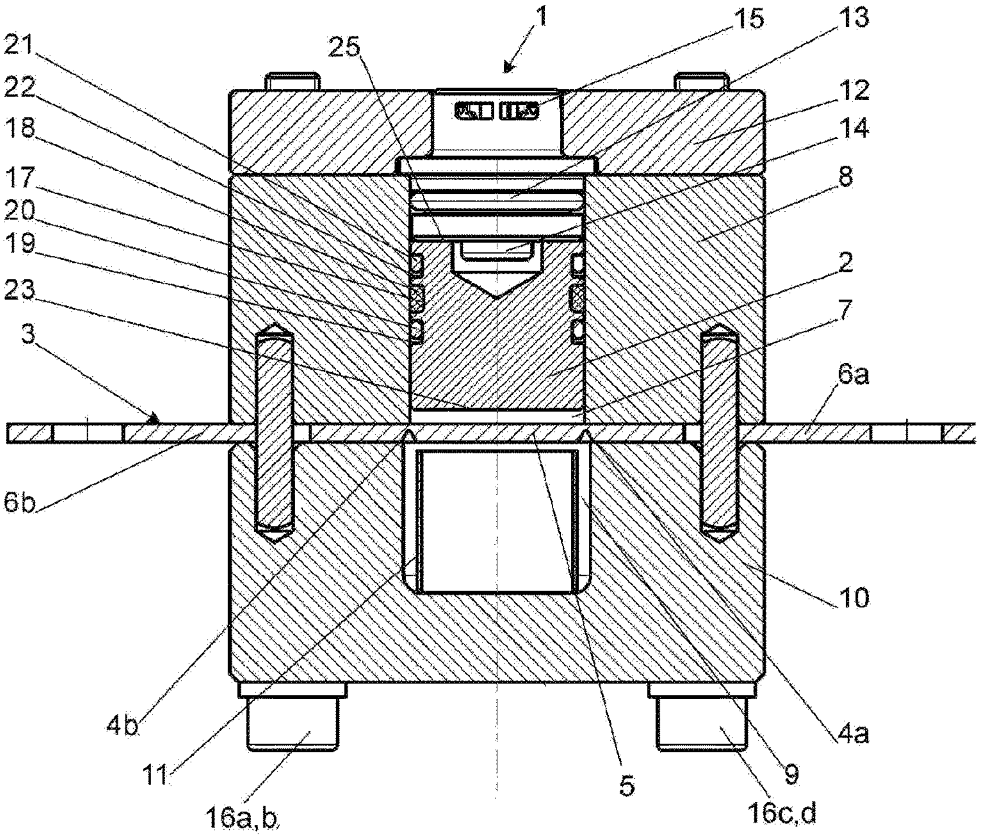
FIG. 1 shows an embodiment of a current breaker according to the invention in the non-triggered state.

An embodiment of a current breaker according to the invention is shown in FIG. 1. The current breaker 1 has a disconnect punch 2 and a conductor 3 with two separating points 4*a* and 4*b* that delimit a central part 5 from the conductor end parts 6*a* and 6*b*.

The disconnect punch 2 is in a chamber 7 in a housing upper part 8. Another chamber 9 in a lower housing part 10, which can contain a brake element 11, is located below the center part 5.

A cover plate 12 holds an igniter 13 with an explosive charge 14 and an electrical interface 15. The lower housing part 10 and the cover plate 12 are connected to one another by four screws 16*a-d*, that solidly secure the lower housing part 10 to the upper housing part 8.

In contrast to the known designs, the disconnect punch 2 has a groove 17 filled with an extinguishing agent 18. In the construction shown here, further seal grooves 19 and 22 holding respective O-rings 20 and 21 are provided flanking the agent groove 17. The face of the disconnect punch 2 remote from the igniter is the cutting face 23.

When the explosive charge 14 is ignited, the disconnect punch 2 is subjected to pressure. It moves downward as far as the conductor 3 and punches out the part 5 of the conductor 3 at the separating points 4*a* and 4*b* and presses it into the chamber 9 of the lower housing part 10. During further movement of the punch (away from the explosive charge 14), the brake element 11 is compressed.

If current is flowing through the conductor 3 during circuit interruption of the center part 5 from the conductor 3, arcs likely form between the conductor end parts 6*a* and 6*b* and the punched-out part 5. These are confined in the first phase of the circuit interruption process between the disconnect punch 2 and the chamber 9 in the lower housing part 10. The extinguishing effect can be supported by the use of metal filters (not shown here).

Figure 2:
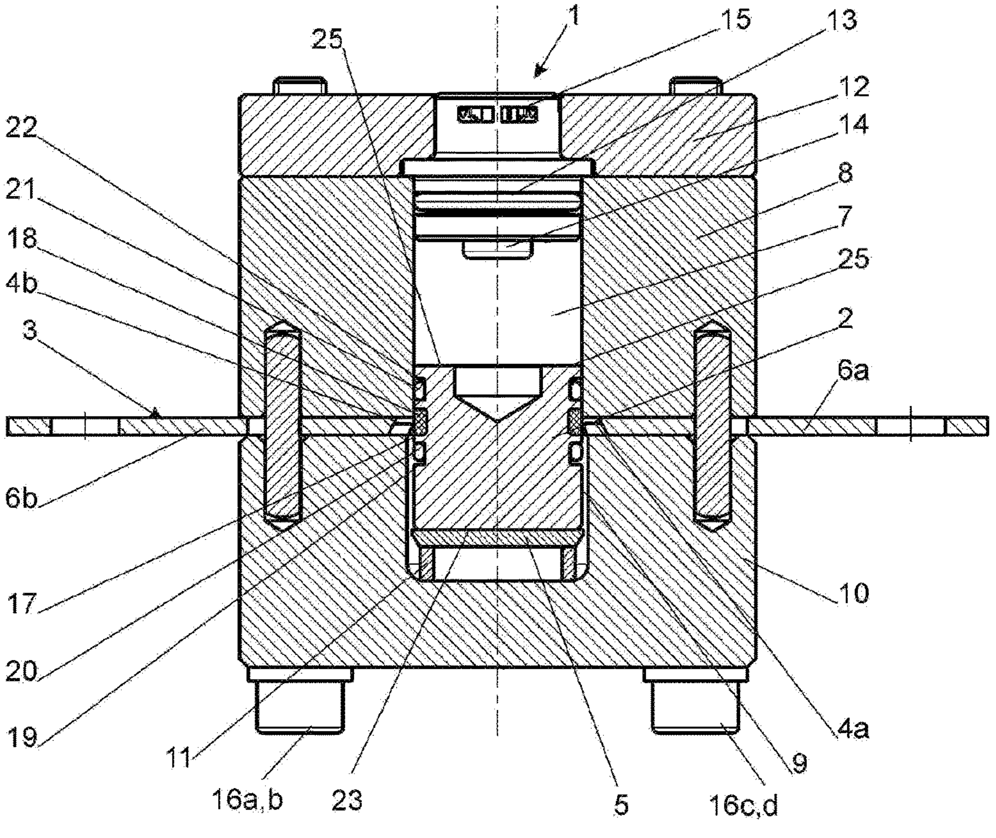
FIG. 2 shows same in the triggered state.

FIG. 2 shows the current breaker according to the invention after triggering has taken place. For the sake of simplicity, the explosive charge 14 has not been shown opened and the deformation of the brake element 11 is also only shown by shortening.

In the advanced course of the circuit interruption, the disconnect punch 2 is spaced from the explosive charge 14 so far that the extinguishing agent 18 reaches the arc between the conductor end parts 6*a* and 6*b* and the part 5 and assists the extinguishing process. In addition to the cooling effect of the extinguishing agent 18, the effect of the arc on the extinguishing agent also leads to a distribution of bits of the extinguishing agent, as a result of which conductive burn-off products produced by the action of the arc on copper and plastic mix with the remaining extinguishing agent and thus a lower passage resistance is achieved after circuit interruption has taken place.

Surprisingly, it has been found that only relatively small amounts of extinguishing agent are required to extinguish the arcs and, in this design, much lower pressure peaks occur in the region of the upper housing part in comparison with the solution of the introduction of the extinguishing agent between a pressure punch and a disconnect punch (corresponding to the AT 517872 mentioned above), which permits lighter construction. Pressure peaks in the known solution should be due to compression of the silicon and the air contained therein.

Silicons, in particular pasty silicons, have proven themselves as extinguishing agents. However, the extinguishing principle was also tested with solid silicon in the form of a hose in the groove 17.

It is particularly advantageous if the extinguishing agent comes into contact with the arc only after half of the punch travel, very particularly preferably in the last third of the punch path. In this case, the use of silicon improves the electrical resistances after circuit interruption.

The filling of the groove 17 with the extinguishing agent 18 is preferably carried out with an external fill tube in which the disconnect punch 2 is held for filling. The fill tube has two diametrally opposite inlet and outlet holes for carrying out the filling. The extinguishing agent is forced in through the inlet hole, flows around the disconnect punch in the groove 17 and exits again at the outlet hole. It is often advantageous to design the outlet hole to be smaller than the inlet hole, and the inlet and outlet holes can also be offset along a central axis A of the disconnect punch.

After filling the groove 17 with extinguishing agent 18, the disconnect punch 2 is displaced in the fill tube so that the filling and overflow holes are left. This movement is again particularly advantageous toward an upper end 25 of the disconnect punch 2 close to the igniter. To this end it is useful if there is an O-ring 20 in the groove 19 between the groove 17 containing the extinguishing agent 18 and the cutting surface 23 of the disconnect punch 2. In the installed state, this O-ring 20 prevents the extinguishing agent 18 from escaping toward the conductor. A further O-ring 21 between extinguishing agent 18 and the upper end 25 of the disconnect punch 2 close to the igniter in the installed state, is particularly advantageous. In this case, the extinguishing agent 18 is trapped between the inner wall of the chamber 7, the outer surface of disconnect punch 2 and the two O-rings 20, 21.

When the disconnect punch 2 is pressed to the correct depth into the chamber 7 in the upper housing part 8, the igniter 13 is inserted into the upper housing part 8.

The invention claimed is:

1. A pyrotechnic current breaker for interrupting a conductor, the pyrotechnic current breaker comprising

- an upper housing part forming an upper chamber;
- a lower housing part forming a lower chamber, the conductor extending through the chambers between the upper housing part and the lower housing part;
- a punch shiftable axially in the chambers and formed with a radially outwardly open agent groove movable between the chambers on shifting of the punch;
- an igniter for shifting the punch in the chambers through the conductor to punch a central part therefrom; and
- an extinguishing agent in the groove for suppressing or extinguishing an arc produced during conductor interruption.

2. The pyrotechnic current breaker according to claim 1, further comprising:

- seals flanking the groove between the punch and the housing in respective seal grooves of the punch.

3. The pyrotechnic current breaker according to claim 2, wherein one of the seals is further from the igniter than the extinguishing agent.

4. The pyrotechnic current breaker according to claim 2, wherein the seals are provided on both sides of the extinguishing agent.

5. The pyrotechnic current breaker according to claim 1, wherein a quantity of extinguishing agent 1 is between 0.3 and 5 g.

6. The pyrotechnic current breaker according to claim 1, wherein an axial length of the groove is 1-20 mm.

7. The pyrotechnic current breaker according to claim 1, wherein a depth of the groove is at most 40% of a diameter of the punch.

8. The pyrotechnic current breaker according to claim 1, wherein the extinguishing agent is a silicon or a silicon-containing substance.

9. The pyrotechnic current breaker according to claim 8, wherein the silicon is a liquid or a paste.

10. The pyrotechnic current breaker according to claim 8, wherein the silicon is solid.

11. The pyrotechnic current breaker according to claim 10, wherein the silicon is a tube.

12. The pyrotechnic current breaker according to claim 1, wherein the extinguishing agent is at a level of end parts of the conductor only after 50% of a punch travel.

13. A method of making a pyrotechnic current breaker according to claim 1, wherein first the upper housing part, the lower housing part and the punch with the groove for the extinguishing agent are provided, then the punch is inserted into an external fill tube whose cross section corresponds to a cross-section of the chambers in the housing, then the groove is filled, and then the fill tube is placed on the upper housing part and the punch is pushed into the chambers, after which the igniter is placed on the chambers, and then the upper housing part and the lower housing part are connected to one another on opposite sides of the conductor.

14. The method according to claim 13, wherein the fill tube has at least an inlet hole for supplying the extinguishing agent and an outlet hole for draining off the extinguishing agent, the punch being positioned in the fill tube in such a way that the two holes lie at a same axial height as the groove in the punch, extinguishing medium being fed through the inlet hole until extinguishing agent emerges from the outlet hole.

15. The method according to claim 14, wherein a cross-section of the outlet hole for draining off the extinguishing agent from the fill tube is smaller than a cross-section of the inlet hole for feeding and/or the two holes are axially offset along a central axis of the punch.

* * * * *